United States Patent
Rose

(10) Patent No.: US 6,542,877 B1
(45) Date of Patent: Apr. 1, 2003

(54) METHOD AND APPARATUS FOR POWER SERIES TRAINING USING A CHANGE-VARIABLE

(76) Inventor: Ralph E. Rose, 1324 S. Winchester Blvd., #38, San Jose, CA (US) 95128

( * ) Notice: Subject to any disclaimer, the term of this patent is extended or adjusted under 35 U.S.C. 154(b) by 0 days.

(21) Appl. No.: 09/568,640

(22) Filed: May 10, 2000

(51) Int. Cl.[7] .............................................. G06F 15/18
(52) U.S. Cl. ........................................ 706/16; 706/25
(58) Field of Search ..................................... 706/16, 25

(56) References Cited

U.S. PATENT DOCUMENTS 6,128,609 A * 10/2000 Rose .......................... 706/25

OTHER PUBLICATIONS

Lo et al, "Power System Transient Stability Analysis by Using Modified Kohonen Network", IEEE ICNN Nov.–Dec. 1995.*

Chen et al, "Power Series Analyses of Back–Propagation Neural Networks" IEEE IJCNN Jul. 1991.*

* cited by examiner

Primary Examiner—George B. Davis
(74) Attorney, Agent, or Firm—Townsend and Townsend and Crew LLP; Kenneth R. Allen

(57) ABSTRACT

A method is provided for calculating the change in level which is output from a multivariable power series as a separate variable, where this change out put signal is the change in level which is output when supply input is from two different data points. This method requires defining a structure of a change-variable and modifying the arithmetic operations so this structure can be processed. A similar procedure is followed to calculate the derivative of the parameters used in the construction of the multivariable power series with this change output signal. Given an error in the change output signal and the existents of appropriate derivatives, it is possible to train the power series using the change-variable. As with any training algorithm, a matrix technique can be used to increase the training rate.

11 Claims, 6 Drawing Sheets

METHOD AND APPARATUS FOR POWER SERIES TRAINING USING A CHANGE-VARIABLE

BACKGROUND OF THE INVENTION

The present invention relates to techniques useful for training a multivariable power series. The adaptive systems that are being proposed are the same as that that have been suggested for use with an artificial neural network.

A power series is defined as a weighted sum of product terms. The highest power of a variable in the power series is defined as the order of that variable. As an example:

$$output = \sum_{i,j,k=0}^{I,J,K} a_{ijk} x_1^i x_2^j x_3^k$$

The parameter $a_{ijk}$ is the weight of the term $x_1^i x_2^j x_3^k$. In this sum, the highest power of the variable $x_1$ is I. I is said to be the order of the variable $x_1$.

There is a need for an alternative technique for training this system. One technique for adjustment of parameters or training known to the inventor, which may not be prior art to the present invention, is to allocate the level error to the parameters based on their derivatives with output.

In addition, a number of problems must be addressed and overcome before advanced training techniques can be implemented. These include.

1) developing a recursive technique for evaluating a multivariable power series that requires the minimum number of multiplications and additions.
2) permitting the code used in the previous statement to evaluate any power series involving any number of variables and have the power series so developed be of any order with any variable.
3) developing a recursive technique for calculating the derivative of all parameters with the power series' output, so that these derivatives can be used for training the power series.
4) developing an integrated matrix technique that decides which of two matrix techniques to use or if neither matrix technique can be used because the determinants of the coefficients are zero, providing an alternate technique.

The present invention addresses and overcomes these problems.

SUMMARY OF THE INVENTION

According to the invention, a method is provided for using change in input value between two data points to calculate the change output from a multivariable power series as a separate signal. The method of calculating the change output as a separate signal is generalized so that the derivative of all parameters used in the construction of the multivariable power series can be calculated with the change output signal. The availability of this derivative and ability to calculate an error in the level of the change output signal, permits the power series to be trained using the change output signal. The training algorithm according to the invention involves permitting direct calculation of the change output as a separate variable, and also calculation of the derivative of all parameters used in the construction of multivariable power series with this change output. The value of these parameters will be adjusted using the calculated derivatives and the error in the change output signal.

Matrix techniques can be used to increase the training rate. Because no single matrix technique can be used under all circumstances, a further decision technique has been developed for deciding which of three techniques, including two matrix techniques, should be used under a given set of circumstances. When using the technique according to the invention, it is useful to define data-points which combine an array of input values and a desired output value so that it can be adapted to use with new training techniques.

The inventive modification to prior art technology for obtaining a change level output from a power series is use a change variable. This can be done by combining two normal data-points to create a change-data-point. A change-data-point includes an array of change-variable input values and a desired change output value. A change-variable is a structure of level and Δlevel, where Δlevel is the change of level between the two data points. By overloading the multiplication and addition operators a technique has been developed for calculating the change output from the power series directly. By using the same technique, the derivative of all parameters with the change output can be calculated and the power series can be trained using the change-variable.

The existence of efficient techniques for calculating the change output and derivative of all parameters with change output is dependent on the existence of efficient technique for calculating these same items for level training.

The invention will be better understood by reference to the following detailed description in conjunction with the following drawings.

DESCRIPTION OF THE SPECIFIC EMBODIMENTS

Processing The Change-Variable

The first step in the ability to learn or adjust the parameter values based on the difference signal is the ability to calculate the derivative of the parameters with the difference output. As a first step in this process, a means will be shown to calculate the difference output as a separate variable. To start this process, the level of one point will be expressed as x while the level at a different point will be expressed as x+Δx. If two values are multiplied the difference output can be calculated from:

$$\Delta out = (x_1 + \Delta x_1)(x_2 + \Delta x_2) - x_1 x_2 \tag{1}$$

This equation evaluates to:

$$\Delta out = x_1 \Delta x_2 + x_2 \Delta x_1 + \Delta x_1 \Delta x_2 \tag{2}$$

Using this approach, there are then two signals that are developed by the power series—level and change of level.

The equation used to determine the output of a multivariable power series is:

$$out = \sum_{i,j,k=0}^{I,J,K} a_{ijk} x_1^i x_2^j x_3^k \quad (3)$$

Since a way has just been defined for overloading the multiplication and addition operators, the output of a power series can also be a change of level signal. An equation that can be used to calculate the value of this change of level signal is:

$$\Delta out = \sum_{i,j,k=0}^{I,J,K} a_{ijk} \Delta level_{ijk} \quad (4)$$

where $\Delta level_{ijk}$ is defined by repetitive application of Equation (2). Using the results of Equation (4) is then possible to calculate the derivative of each parameter of the power series with the change of level signal produced by the power series ($\Delta$out).

$$\frac{d(\Delta out)}{d a_{ijk}} = \Delta level_{ijk} \quad (5)$$

Figure 1:
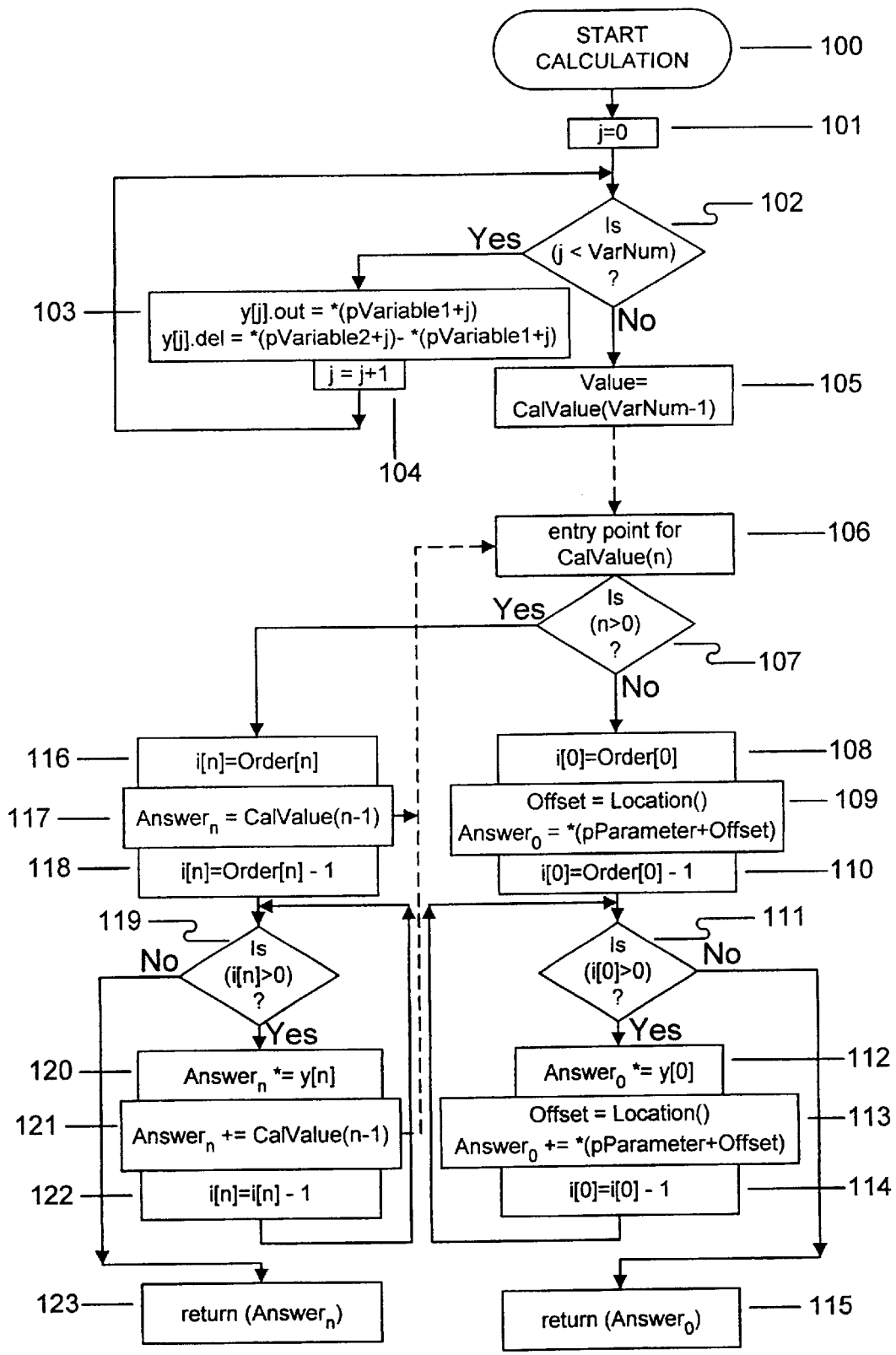
FIG. 1 is a flow graph for calculating the change output signal of a multivariable power series.

In terms of computer programming, there is a very easy way of calculating the difference output without having to write a lot of new code, namely, to overload the multiplication and addition operators so that these operators are capable of acting on a structure consisting of level and $\Delta$level. The equations then used to calculate the output of the power series can also be used to calculate the difference output. The flow graph of the computer program capable of calculating the difference output of a power series is shown in FIG. 1.

The h file that defines the structure that permit a computer program to use the same procedure used to calculate its level to calculate its change of level output is shown below:

```
180    struct VType
181    {
182      float out,del;
183      VType& operator+= (const VType& w);
184      VType& operator+= (float a);
185      VType& operator*= (float a);
186      friend VType operator+ (const VType& v,
187          constVType& w);
188      friend VType operator- (const VType& v,
188          constVType& w);
189      friend VType operator+ (const VType& v,float a);
190      friend VType operator+ (float a,const VType& v);
191      friend VType operator* (float a,const VType& w);
192      friend VType operator* (const VType& w,float a);
193      friend VType operator* (const VType& x,
194          const VType& y);
195      friend VType operator/ (const VType& v,float a);
196    };
```

This structure VType contains two floats, the level variable, out and the change level variable, del. This code is C++ and defines a number of overloaded multiplication and addition operators. The code defining these overloaded operators are shown below:

```
VType operator+ (const VType& W,const VType& V)
{
  VType U;
  U.out=W.out+V.out;
  U.del=W.del+V.del;
  return (U);
}
VType operator+ (const VType& W,float A)
{
  VType U;
  U.out=W.out+A;
  U.del=W.del;
  return (U);
}
VType operator+ (float A,const VType& W)
{
  VType U;
  U.out=W.out+A;
  U.del=W.del;
  return (U);
}
VType operator- (const VType& W,const VType& V)
{
  VType U;
  U.out=W.out-V.out;
  U.del=W.del-V.del;
  return (U);
}
VType operator* (float A,const VType& W)
{
  VType U;
  U.out=A*W.out;
  U.del=A*W.del;
  return (U);
}
VType operator* (const VType& W,float A)
{
  VType U;
  U.out=A*W.out;
  U.del=A*W.del;
  return (U);
}
VType operator/ (const VType& W,float A)
{
  VType U;
  U.out=W.out/A;
  U.del=W.del/A;
  return (U);
}
VType operator* (const VType& X,const VType& Y)
{
  VType U;
  U.out=X.out*Y.out;
  U.del=X.out*Y.del+X.del*Y.out+X.del*Y.del;
  return (U);
}
VType& VType::operator+= (const VType& W)
{
  out += W.out;
  del += W.del;
  return (*this);
}
VType& VType::operator*= (const VType& W)
{
  out *= W.out;
  del=out*W.del+del*W.out+del*W.del;
  return (*this);
}
VType& VType::operator+= (float A)
{
  this->out += A;
  return (*this);
}
VType& VType::operator*= (float A)
{
  this->out *= A;
  this->del *= A;
  return (*this);
}
```

```
VType& VType::operator= (float A)
{
    this->out=A;
    this->del=0.0;
    return (*this);
}
```

In this code a single variable, has been replaced by a structure containing two variables, level and change of level or del. The summing operation is a straight forward operation of adding each variable to its equivalent variable in the other structure. The multiplication operation is a little more complicated. While the level variable is still multiplied by the level variable in the other structure, the operations necessary to calculate the Δout are defined by Equation (2).

Calculating Change Signal Output

One way of calculating the change output of a multivariable power series is to modify a technique used to calculate the level output of a power series. A way of calculating the level output of a power series can be explained by rearranging the equation of a normal multivariable power series shown by Equation (6) to a form shown by Equation (7).

$$output = \sum_{i,j,k=0}^{I,J,K} a_{ijk} x_1^i x_2^j x_3^k \tag{6}$$

Equation (6) can be rearranged to be:

$$output = \sum_{k=0}^{K} x_3^k \sum_{i,j=0}^{I,J} a_{ijk} x_1^i x_2^j \tag{7}$$

In Equation (7) the inner summation is evaluated (K+1) times. Each time a power series is built with two variables but constructed using different parameters. Given the terms representing the value of the inner summation, the power series of the variable in the outer summation can be constructed using the normal technique for building a power series of one variable. The procedure used for evaluating the terms of the inner summation can be expanded in the same way the original power series was expanded. This suggest a recursive procedure to evaluate a multivariable power series. We then have a situation that in order to evaluate a multivariable power series, it is necessary to evaluate the terms of the terms of the terms of the terms, etc. until it is only necessary to evaluate a power series of one variable. To accomplish the task of developing a recursive procedure for evaluating a multivariable power series is necessary to develop a more systematic way of expressing Equation (6). An array of integers can be used to represent the exponent of the variables. Since in the programming language C++ the indices of an array vary from zero to some maximum value, the smallest number of a variable will be zero. The highest power of each variable in the power series can also be put in an array. The equivalent power series to that in Equation (6) with these changes is:

$$output = \sum_{i=0}^{\overline{Order}} a_i x_0^{i0} x_1^{i1} x_2^{i2} \tag{8}$$

If the recursion was started with the variable having the largest index, the recursion would always terminate when control integer reached zero. If the number of variables in the power series is VarNum, then the recursive function will be first called with a control integer of VarNum-1. The power series built using the variable with the highest index will be built using the values returned from calls to the same procedure called with a control integer one less than that used to build the power series with the highest index. This process will continue until the control integer is zero, then the procedure will build the base power series with real parameters.

A flow graph defining this recursive procedure for calculating the change output is shown in FIG. 1. This flow graph will be used to explain the actual code that will be included in the text.

Before the procedure shown in FIG. 1 can be started, the array of variables used to calculate the power series' output must be defined. In this procedure, since the objective is to calculate the change output, the array of variables must be an array of VType structures. In this flow graph, the array of level input variables from the two data points used the construct the array of VType variables are pointed to by two pointers pVariable1 and pVariable2. In blocks 101 through block 104, the array of y[ ] variables of type VType are constructed. The number of variables contained in this array is stored in an integer VarNum. The parameter used to calculate the power series' output is contained in an array pointed to by pointer pParameter. The order of the resulting polynomial with each input variable is defined by an array of integers Order[ ]. The dashed lines in FIG. 1 define the recursive calls used to calculate the value of the power series' output. The recursive procedure is first called in step 105 with a value of n equal to VarNum-1. Each recursive call to the function reduces the value of the control integer by one. This process continues until the control integer is zero. Then the procedure CalValue(n) calculates the output of a power series built with actual parameters. Until then the procedure calculates the output of power series built not with parameters but with other power series. Each call to the function CalValue(n-1) calculates the value of a power series built with n variables. In steps 116 through step 123 the value of these calls are used to build another power series with n variables. Step 107 is used to decide if the power series being built will be built with actual parameters or with other power series. The parameter used in the construction of the power series is determined by an array of integers, i[ ]. The function Location( ) uses this array of integers, i[ ], to calculate the index to array of parameters. Each pass through the loop of steps 119 through step 122 changes value of an integer i[n], and hence will cause the call to the function CalValue(n-1) to built a power series using different parameters. Both the steps, 119 through step 122, and steps 111 through step 114 built the power series by first starting with parameter or power series and then successively multiple the results by a variable and then add a parameter or power series.

The multiplications that take place in steps 112 and 120 are complex operations involving multiplication of structures, VType. This is also true of the additions that take place in steps 113 and 121. The function CalValue( ) returns a structure, VType, containing both level and change of level. This structure defined in the h file shown above, contains two floats—out defining level and del defining change of level. In FIG. 1 the dashed lines show the recursive calls to the function CalValue(n). The blocks between block 106, the entry point to the procedure CalValue( ), and blocks 115 and 123, the return blocks, are blocks that define the procedure. When the procedure calls itself from block 117, the value n−1, becomes the new n value when the procedure is re-entered. When a return block is reached, control return to the block originating the call.

The code implementing the flow graph shown in FIG. 1 is shown below:

```
320    VType PsType::CalOut(float* pVariable1,float* pVariable2)
321    {
322      VType Answer;
323      int i;
324      for (i=0;i< VarNum;i++)
325      {
326        y[i].out= *(pVariable1+i);
327        y[i].del= *(pVariable2+i) − *(pVariable1+i);
328      }
329      Answer=CalValue(VarNum−1);
330      return (Answer);
331    }
332    VType PsType::CalValue(int n)
333    {
334      long Offset;
335      int ii;
336      VType Answer,Value;
337      if(n > 0)
338      {
339        i[n]=Order[n];
340        Answer=CalValue(n−1);
341        for (i[n]=Order[n]−1;i[n]>= 0;i[n]−−)
342        {
343          Answer *= y[n];
344          Answer += CalValue(n−1);
345        }
346      }
347      else
348      {
349        i[0]=Order[0];
350        Offset=Location( );
351        Answer= *(pParameter+Offset);
352        for (i[0]=Order[0]−1;i[0]>= 0;i[0]−−)
353        {
354          Answer *= y[0];
355          Offset=Location( );
356          Answer += *(pParameter+Offset);
357        }
358      }
359      return (Answer);
360    }
361    long PsType::Location(void)
362    {
363      long Answer;
364      int Degree;
365      Answer= i[VarNum−1];
366      for (Degree=VarNum−1;Degree> 0;Degree−−)
367      {
368        Answer *= Order[Degree]+1;
369        Answer += i[Degree−1];
370      }
371      return (Answer);
372    }
```

In this code the if statement on line 337 is equivalent to control block 107. The for control statement on line 341 is functionally equivalent task performed by blocks 118, 119 and 122 in FIG. 1. The for loop between lines 341 and 345 is equivalent to blocks 118 through 122. The for loop between lines 352 and 357 is equivalent to blocks 110 through 114.

The procedure Location( ) that is used to calculate the offset of the parameter being used in the array of parameters pointed to by pointer pParameter in blocks 109 and 113 as needs to be discussed. This procedure uses the array of i[ ] values and the array of Order[ ] to calculate the offset. The way the procedure is organized is that i[0] is the least significant digit while i[VarNum−1] is the most significant digit. The significance of each digit i[n] over the digit i[n−1] is Order[n−1].

The change in level between the two data points can be determined by looking at the value of Value.del in block 105 after the procedure has return it answer. In the code the answer will be in the del part of the answer returned by CalValue( ) in line 320.

Calculating Derivative of Parameters with Change Signal

The procedure used to calculate the derivative of the parameters with change in level output is built on a procedure used to calculate the derivative of the parameters with the level output. The technique to develop this procedure will be first to develop the procedure for finding the derivative of parameters with level.

The technique for calculating the derivative of all parameters with the output is very similar to the technique used to calculate its value. When Equation (7) is rearranged as shown in Equation (8), the parameters used in the evaluation of each term have been separated into different groups.

$$output = \sum_{i_2=0}^{Order_2} x_2^{i_2} \sum_{i_1,i_0=0}^{Order_1,Order_0} a_j x_0^{i_0} x_1^{i_1} \qquad (9)$$

The uniqueness of each parameter-group is that only members of this group are multiplied by $x_2$ to a certain power. In these circumstances, the value must be passed down the recursion as it moves from larger to smaller parameter-groups. The value that must be passed is a float equal in value to the value of all variables raised to a certain powers that must be multiplied by each other to calculate the value of the derivative of all parameters in the parameter-group. This float will be referred to as the derivative-value. When this procedure will be first called, it will be called with an integer n value of VarNum−1, and derivative-value of one (1.0). As this procedure calls itself the value of integer n will be reduced by one and the value of $i_n$ will change and the value of the passed derivative-value will be multiplied by $x_n^{i_n}$. This process will continue until the value of n equals zero. At this time the procedure no longer calls itself, but multiplies the inputted derivative-value by $x_0^{i_0}$ and assigns this value to the individual parameter derivatives as it walks through all possible values of $i_0$. To minimize the number of multiplications, the index variable will move from their lowest range to their highest range. This is because $x^{n+1} = x^n \times x$.

Figure 2:
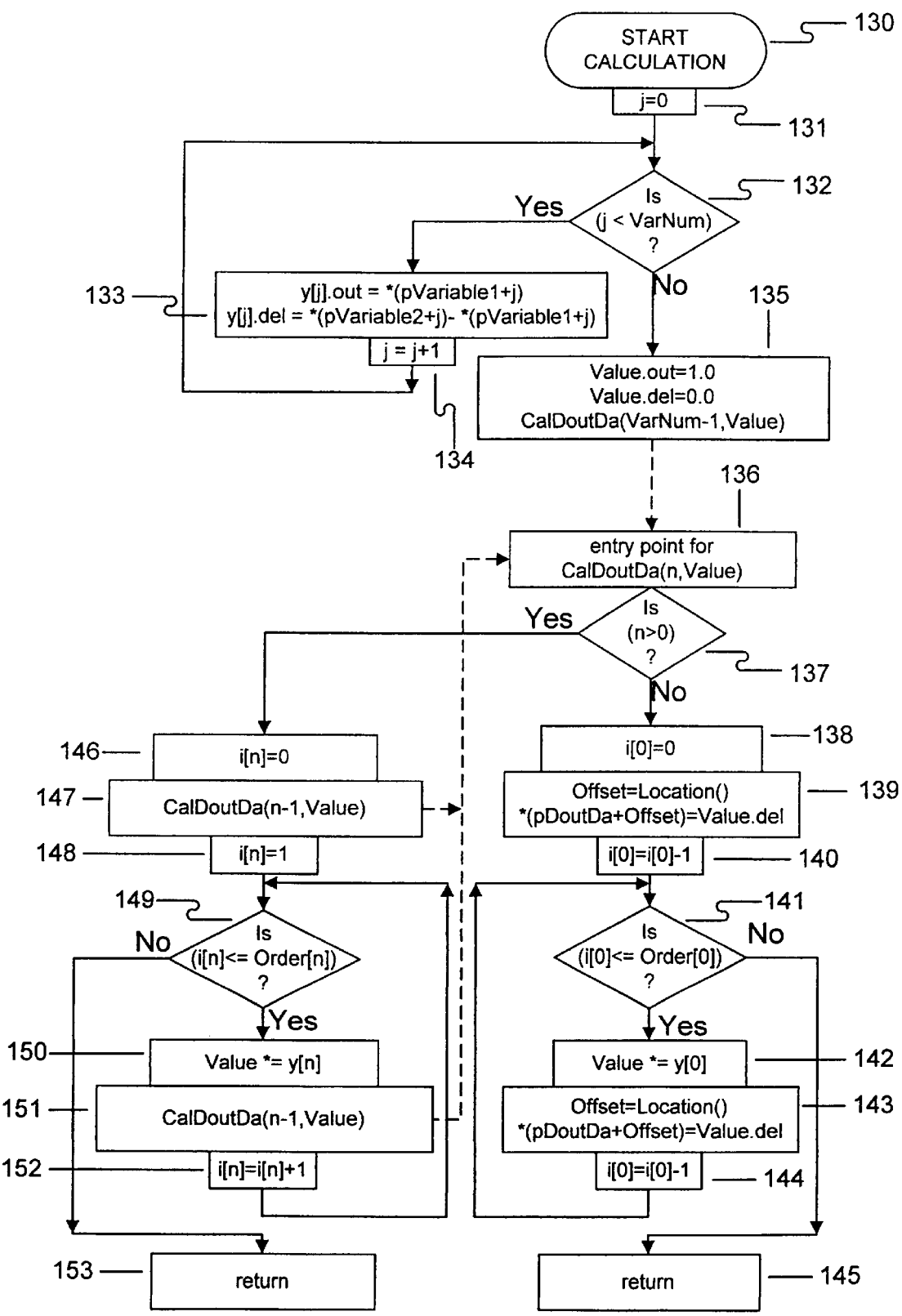
FIG. 2 is a flow graph of the procedure used for calculating the derivatives of all parameters with the power series' change output signal.

The flow graph of the code used to calculate the derivatives of all the parameters used in the power series with respect to the power series' output is shown in FIG. 2. In block 135 the procedure CalDoutDa( ) is first called with a value of n equal to VarNum-1 and the value of the derivative-value of one (1.0). In control block 137, the value of n is tested. If the value of n is greater than zero, the procedure continues the call itself. In the loop through blocks 149 through 152, the value of the derivative-value Value is modified along with the incrementing of i[n]. When i[n] is no longer less than or equal to Order[n], the loop is terminated and the procedure is ends. When the procedure is entered with a value of n equal to zero, the loop through the blocks 141 through 144 is started. Before the loop is started in block 138 the value of i[0] is set to zero. Then in block 139, the procedure Location( ) is used to assign a value to Offset. The value of Offset determines which parameter-derivative is used and then the del part of the derivative-value Value is then assigned to parameter-derivative. When passing through this loop the value of i[0] is incremented, and derivative-value Value is multiplied by the VType structure of y[0]. When the value of i[0] is no longer less than or equal to the value of Order[0], the loop is terminated and the procedure ends.

```
250    void PsTYPe::CalDoutDa(float* pVariable1,float* pVariable2)
251    {
252      int i;
253      VType VOne;
254      for (i=0;i< VarNum;i++)
255      {
256        y[i].out= *(pVariable1 +i);
257        y[i].del= *(pVariable2+i) - *(pVariable1+i);
258      }
259      VOne.out=1.0;
260      VOne.del=0.0;
261      CalDoutDa(VarNum-1,VOne);
262    }
263    void PsType::CalDoutDa(int Num,VType Value)
264    {
265      int j,Offset;
266      if (Num > 0)
267      {
268        i[Num]=0;
269        CalDoutDa(Num-1,Value);
270        for i![Num=1;i[Num]<= Order[Num];i[Num]++)
271        {
272          Value *= y[Num];
273          CalDoutDa(Num-1 ,Value);
274        }
275      }
276      else
277      {
278        i[0]=0;
279        Offset=Location( );
280        *(pDoutDa+Offset)=Value.del;
281        for (i[0]=1;i[0]<= Order[0];i[0]++)
282        {
283          Value *= y[0];
284          Offset=Location( );
285          *(pDoutDa+Offset)=Value.del;
286        }
287      }
288    }
```

A first step in this procedure is to calculate the complex variables containing both level and change of level between the two test points. The array of y[ ] used to calculate the change in level output are built between blocks 131, and 134. In FIG. 2, the value assigned to the derivatives in blocks 139 and 143. The value assigned is the del part of the structure Value. The equivalent locations in the code are lines 280 and 285.

Training Of Power Series

Figure 3:
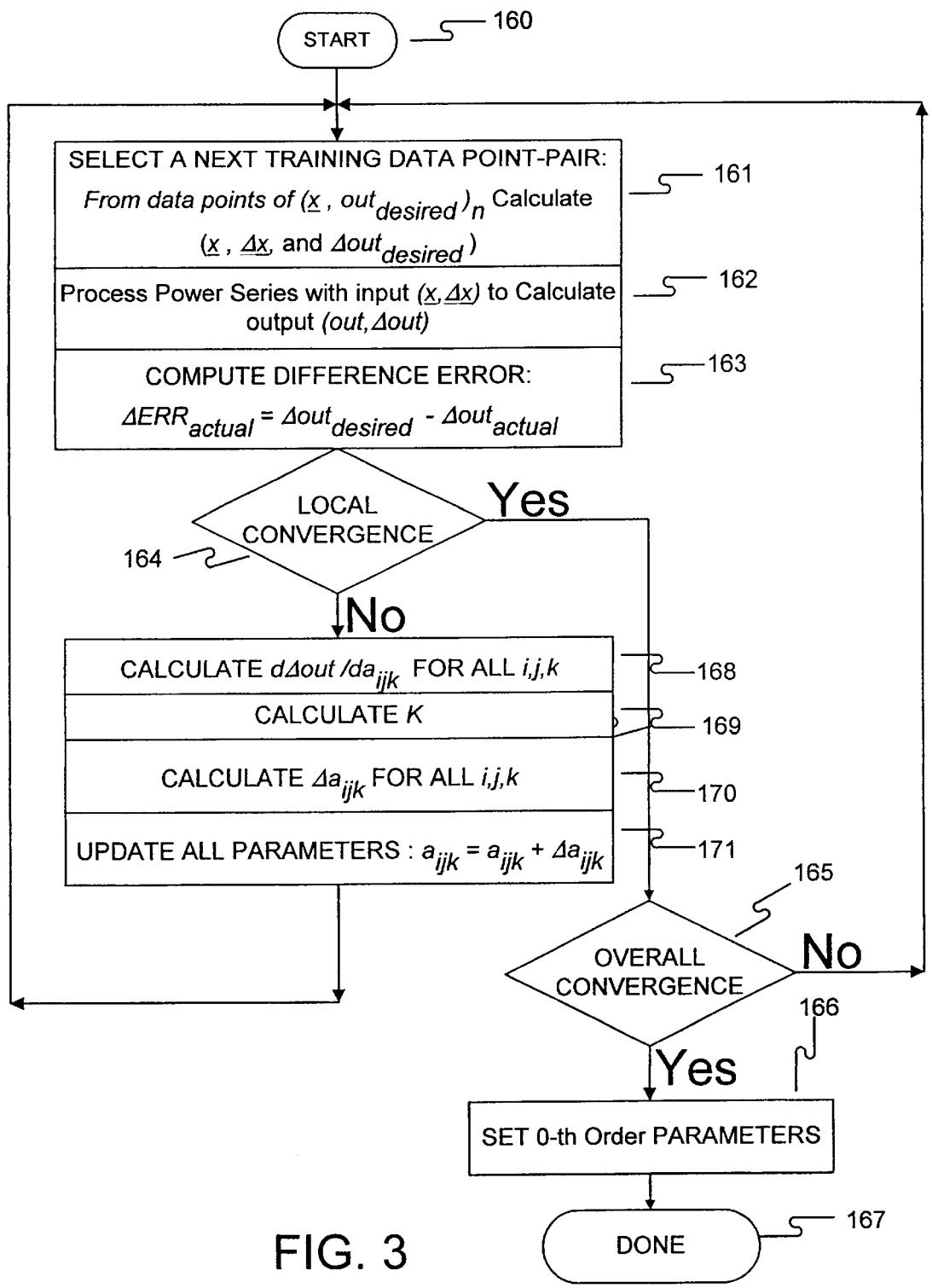
FIG. 3 is a flow graph of the procedure used to train the multi-variable power series using the change output signal.

A flow graph defining the procedure used to train a power series using change in level between two data points is shown in FIG. 3. In step 161 a data-point-pair is selected. As part of this step the change in the input or $\Delta x$ for all variables as well as the expected change in output or $\Delta out$ are calculated. This means the change variables for all inputs variable are calculated. In step 162 the power series is processed with the change variable inputs consisting of two floats level and $\Delta$level to produce a change variable output consisting of two floats which are assigned to out and $\Delta out$, respectively. In step 163, the actual $\Delta out$ is compared with the desired $\Delta out$ to obtain an error, $\Delta ERR_{actual}$.

$$\Delta ERR_{actual} = \Delta out_{desired} - \Delta out_{actual} \tag{10}$$

In control block 164 a test is performed to determine if a training cycle is necessary at the present data-point-pair. In block 168, the derivatives of all parameters with $\Delta out$ are calculated. These derivatives are used in block 169 to calculate the value of K. Then in block 170, the difference error, parameter-derivatives and K are used to calculate a change in the value of all parameters or $\Delta a_{ijk}$. Step 168 uses the code described in FIG. 2 to calculate the derivative of all parameters with the $\Delta$level output of the power series. Step 169, the value of the correction constant K will be calculated using Equation (11).

$$K = \sum_{i,j,k=0}^{I,J,K} \left( \frac{d(\Delta out)}{d a_{ijk}} \right)^2 \tag{11}$$

and in step 170, the change in the value of all parameters is calculated using Equation (12).

$$\Delta a_{ijk} = \left( \frac{d(\Delta out)}{d a_{ijk}} \right) \frac{\Delta ERR_{actual}}{K} \tag{12}$$

In step 171, Equation (13) is used to add the change in parameter values to the parameters themselves and the value of the parameters are updated.

$$a_{ijk} = a_{ijk} + \Delta a_{ijk} \tag{13}$$

In step 166, the actual level of a single data point is compared to the desired level. Any error in the level output is used to adjust the value of the parameter in the power series that is not multiplied by any variables. This is necessary because this parameter will not have any effect on the change in level output and hence will not be adjusted properly. Another way of look at the same problem is that the different error can be completely eliminated and there can still be a significant level error. The curve can have the correct shape and have its level shifted from the desired level.

Using A Matrix To Increase Learning Rate

Figure 4:
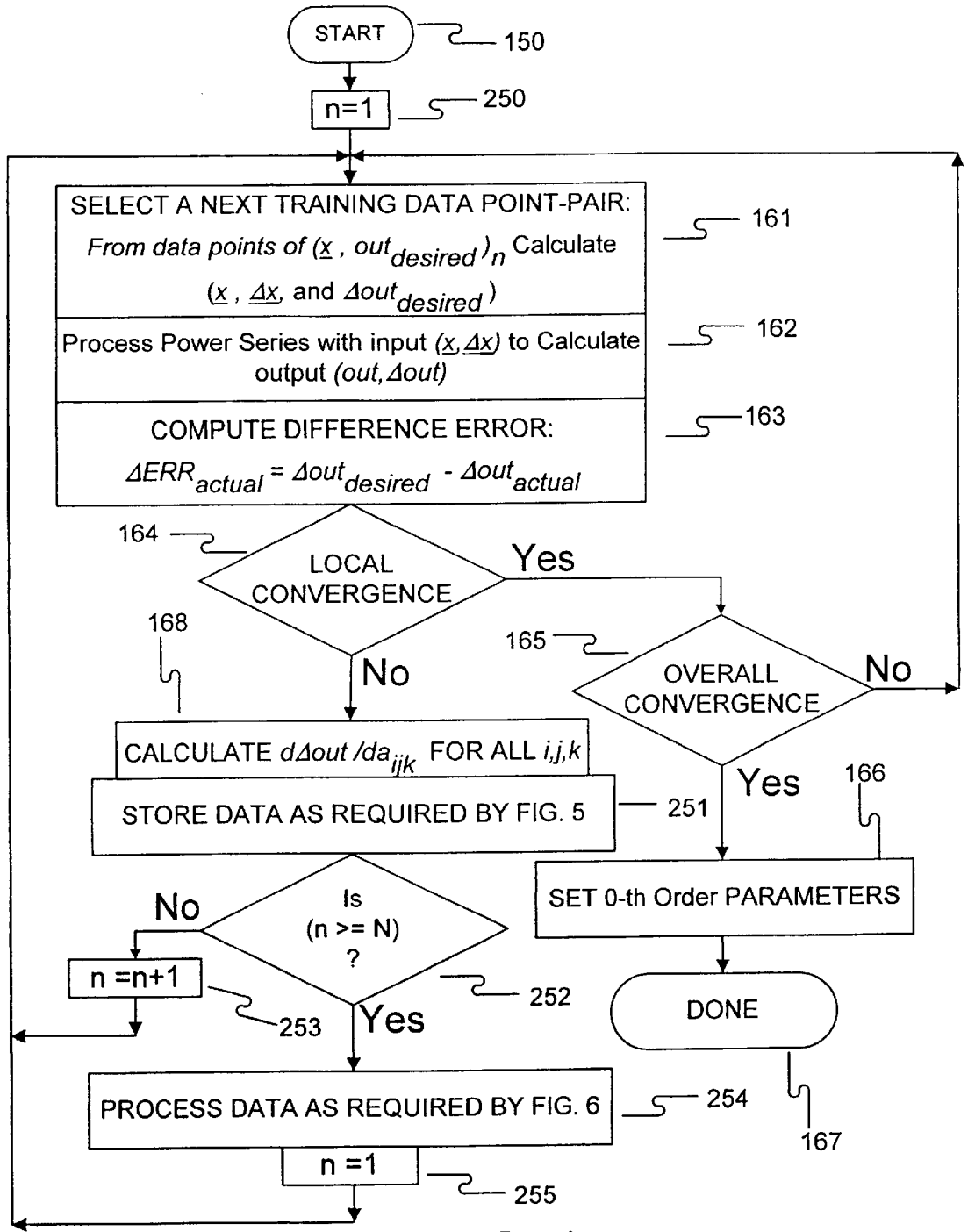
FIG. 4 is the flow graph of the procedure shown in FIG. 3 modified to use a matrix, etc.

The training procedure for using $\Delta$level error is shown in FIG. 3. The proposed modification to this procedure is shown in FIG. 4. The main modification is what happens after block 168, where the derivative of the parameters with the output is calculated. In FIG. 3 the procedure was to incorporate the information from this one data point pair into the value of the parameters. This was done in block 169, 170, and 171. The new procedure is to store the information from this data point in block 251, and then collect information from a number of data point pairs before the information is incorporated collectively in one change of the parameters. When the information from N data point pairs has been collected, control block 252 will direct the flow to block 254. In block 254 the information from all these data point pairs will be incorporated in one change of the parameters. The reason for blocks 250, 253, and 255 is to assure that that the number of data point pairs collected before the processing of block 254 is equal to N. The procedure done in block 251 to store each data point pair, has been expanded in FIG. 5. Similarly the procedure done in block 254 to process the data point pair information to calculate a change in the parameter values, has been expanded in FIG. 6.

There have been two matrix techniques developed. The first matrix technique assumes the existence of one and only one solution. But a matrix can in fact have no solution or multiple solutions. This possibility can be tested by evaluating the determinant of the coefficients of the matrix. If the value of the determinant does not approach zero, the set of equations has a unique solution. However, if the value of the determinant does approach zero, the set of equations can have either no solution or multiple solutions. Which of these two possibilities is true, can be determined by examining the technique used to set up the matrix. In the first matrix technique, where it is assumed take each data point pair can be learned exactly, if the value of the determinant approaches zero, it can be assumed that no solution exist. In the second matrix technique, where the objective is minimize the sum of the square of the errors, if the value of the determinant of the coefficients approaches zero, it can be assumed that there are multiple solution.

Figure 6:
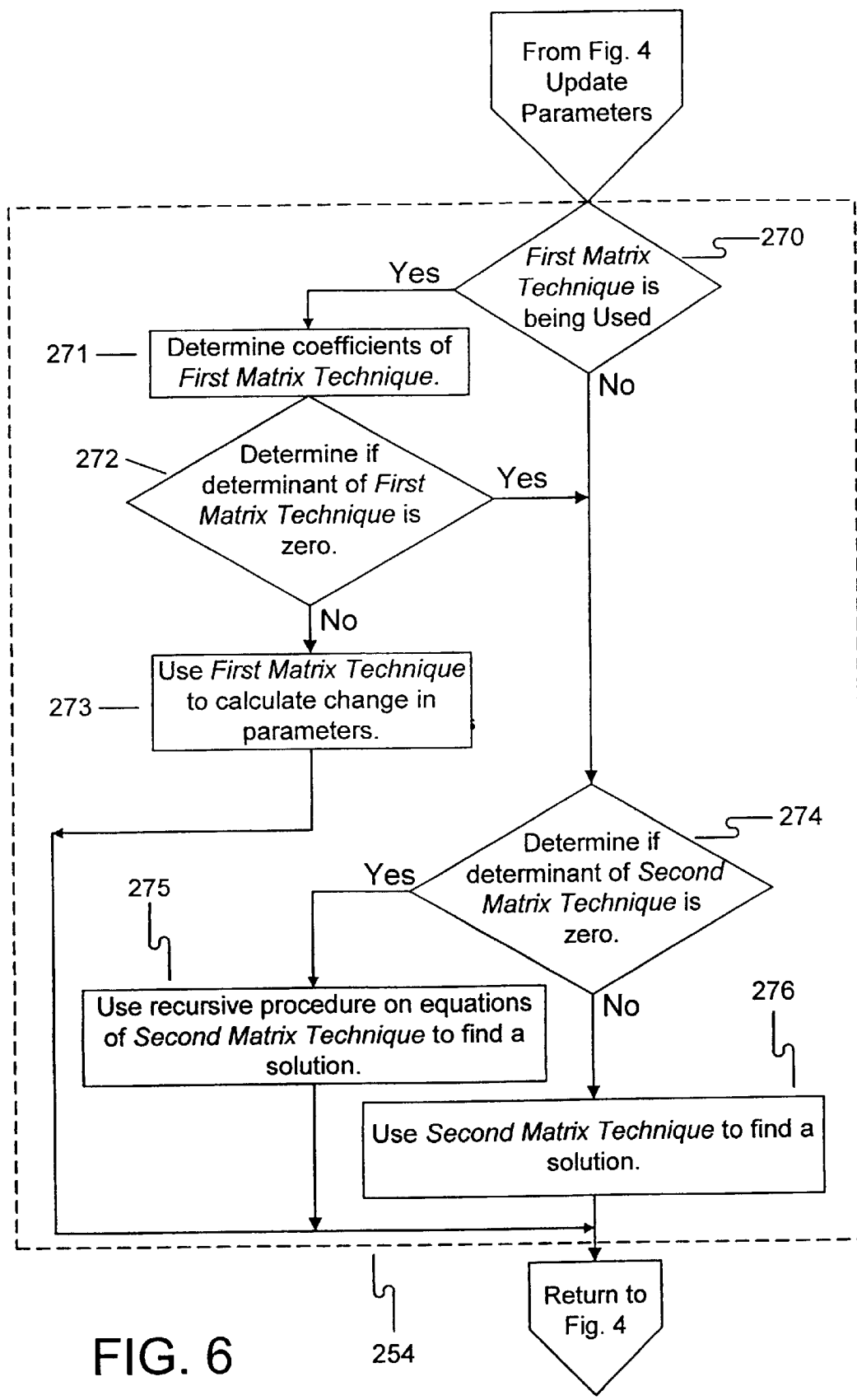
FIG. 6 is expansion of Block 254 used in FIG. 4.

As shown in FIG. 6 the determinant of a matrix technique is evaluated before that matrix technique is used. We still have not discussed the solution if the value the determinant of both matrix techniques approach zero. Under these circumstances a reiterative technique is used on the equations of the second matrix technique. This reiterative technique will eventually converge to one of the solution of the equations used in the second matrix techniques.

If the number of data points that will be incorporated into a matrix technique, the possibility that the first matrix technique can be used becomes small and as a result it may be decided ahead of time that the use of the first matrix technique will not even be attempted. The possibility is incorporated into FIG. 5 in the use of control block 260 in FIG. 5. The second matrix technique does not require the use of the information from the individual data point pairs because this information in use as collected in the construction of the coefficients of the second matrix technique as shown in block 262. The elimination of consideration of the first matrix technique will reduce the data storage requirements After the data from N data point pairs has been collected, the information will be used to calculate the change in parameters in block 254 in FIG. 4. In FIG. 6 block 219 of FIG. 4 has been expanded. The potential use of the first matrix technique is used in control block 270 to determine if the coefficients of the first matrix technique will be calculated in block 271. After the values of these coefficients have been calculated, the determinant of these coefficients will be evaluated. If the value of this determinant is zero, control block 272 will abandon the use of the first matrix technique. If the determinant of the first matrix technique's coefficients is not zero then the first matrix technique will be used to determine the change in parameters in block 273. If the first matrix technique is not being used either by choice or because its determinant evaluates to zero, the determinant of the second matrix technique are evaluated in control block 274. If the value of this determinant is zero then a recursive procedure will be used on the equation of the second matrix technique to find a solution in block 275. If the value of this determinant is not zero, then the second matrix technique will be used to find a solution in block 276.

Figure 5:
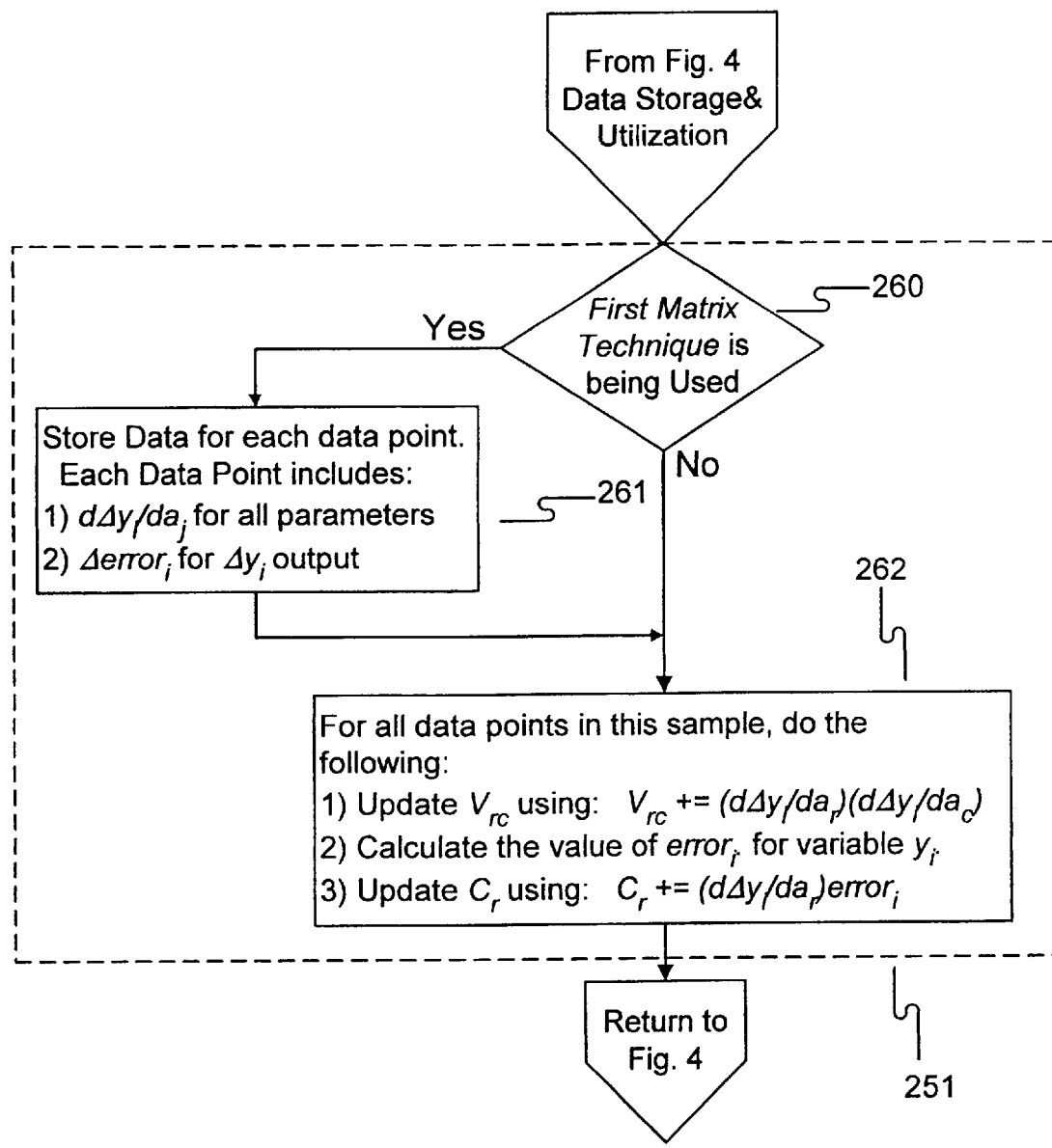
FIG. 5 is expansion of Block 251 used in FIG. 4.

As a result of the procedure discussed in FIGS. 5 and 6, the techniques that must be disclosed in this section are: 1) setting up and using the first matrix technique. 2) setting up and using the second matrix technique. 3) evaluating the determinant of the coefficients of either matrix technique. 4) reiterative technique used to locate one of the solutions of the equations used in the second matrix technique.

A. Setup and Use of the First Matrix Technique

In this discussion, the equations and explanation will assume that level training is being used. This is because it is easier to do so than continually referring to a change of level between two data points, etc. After the technique has been developed, the equations, etc. can be easily converted to change of level.

In the first matrix technique a separate equation is constructed for each data point. During the training of one data point will to some degree undo the training at another data point. This interaction of the training of different data points can be analyzed mathematically. During training, updating the filter's parameters using one training data point t changes the value of $y_i$ variable at data point s by an amount:

$$\text{change out}\Big|_s = \sum_{j=0}^{J} (\Delta a_j \Big|_t) \left( \frac{dout}{da_j} \Big|_s \right). \tag{14}$$

The notation $|_t$ used in Equation (14) is defined to mean "evaluated at data point t"; likewise $|_s$ means "evaluated at data point s." Thus, the change in the value of the output variable out at data point s that results from adjusting parameters at data point t is:

$$\text{change out}\Big|_s = \sum_{j=0}^{J} \left( \left[ \frac{dout}{da_j} \Big|_t \right] \frac{ERR_t}{K_t} \left[ \frac{dout}{da_j} \Big|_s \right] \right). \tag{15}$$

This result is obtained by substituting the result from Equation (12), (modified to use level training) into Equation (14). The error in Equation (15) is denoted by $ERR_t$, or the applied error, to distinguish it from the value of the real error. Substituting Equation (11) into Equation (15) and equating change out$|_s$ to error$|_s$, the result is:

$$\text{error}\Big|_s = \frac{\sum_{j=0}^{J} \left( \left[ \frac{dout}{da_j} \Big|_t \right] \left[ \frac{dout}{da_j} \Big|_s \right] \right) ERR_t}{\sum_{j=0}^{J} \left( \frac{dout}{da_j} \Big|_t \right)^2}, \tag{16}$$

where $ERR_t$ is the applied error used during parameter updating for training data point n. The ratio of the two sums is called the coupling coefficient $G_{st}$ from data point t to data point s:

$$G_{st} = \frac{\sum_{j=0}^{J} \left( \left[ \frac{dout}{da_j} \Big|_t \right] \left[ \frac{dout}{da_j} \Big|_s \right] \right)}{\sum_{j=0}^{J} \left( \frac{dout}{da_j} \Big|_t \right)^2}. \tag{17}$$

The total change error at v will be the sum of the $ERR_t$ applied at all data points. The applied errors ($ERR_1$ and $ERR_2$) that should be applied in the two cases to exactly eliminate the actual errors (error$|_1$ and error$|_2$) at the two data points can be determined from the solution of the following matrix:

$$\begin{bmatrix} 1 & G_{12} \\ G_{21} & 1 \end{bmatrix} \begin{bmatrix} ERR_1 \\ ERR_2 \end{bmatrix} = \begin{bmatrix} \text{error}|_1 \\ \text{error}|_2 \end{bmatrix} \tag{18}$$

The above equation can be generalized for an arbitrary number N of points 1, . . . , N as follows:

$$\begin{bmatrix} 1 & G_{12} & \cdots & G_{1N} \\ G_{12} & 1 & \cdots & G_{2N} \\ \vdots & \vdots & \ddots & \vdots \\ G_{N1} & G_{N2} & \cdots & 1 \end{bmatrix} \begin{bmatrix} ERR_1 \\ ERR_2 \\ \vdots \\ ERR_N \end{bmatrix} = \begin{bmatrix} error|_1 \\ error|_2 \\ \vdots \\ error|_N \end{bmatrix}. \quad (19)$$

This is a linear equation wherein the error-actual values on the right side of the equation are the products of the coupling coefficients and the error-applied values on the left. After the matrix in Equation (19) is used to calculate an array of ERR values or error-applied values from an array of error-actual values, the following equation must be used to apply this change to actual change the value of the parameters.

$$\Delta a_j = \sum_{n=1}^{N} \left( \left[ \frac{dout}{da_j} \bigg|_n \right] \left[ \frac{ERR_n}{K_n} \right] \right), \quad (20)$$

where $$K_n = \sum_{j=0}^{J} \left( \frac{dout}{da_j} \bigg|_n \right)^2 \text{ and,} \quad (21)$$

$a_j = a_j + \Delta a_j$ for all j from 0 to $J$ \quad (22)

Since the objective of this discussion is to train a power series using error in change of level signal, the form of some of the equations must be changed:

$$\Delta error_{actual} = \Delta out_{desired} - \Delta out_{actual} \quad (23)$$

where:

$$\begin{bmatrix} 1 & G_{12} & \cdots & G_{1N} \\ G_{12} & 1 & \cdots & G_{2N} \\ \vdots & \vdots & \ddots & \vdots \\ G_{N1} & G_{N2} & \cdots & 1 \end{bmatrix} \begin{bmatrix} \Delta ERR_1 \\ \Delta ERR_2 \\ \vdots \\ \Delta ERR_N \end{bmatrix} = \begin{bmatrix} \Delta error|_1 \\ \Delta error|_2 \\ \vdots \\ \Delta error|_N \end{bmatrix} \quad (24)$$

and:

$$G_{st} = \frac{\sum_{j=0}^{J} \left( \left[ \frac{d\Delta out}{da_j} \bigg|_t \right] \left[ \frac{d\Delta out}{da_j} \bigg|_s \right] \right)}{\sum_{j=0}^{J} \left( \frac{d\Delta out}{da_j} \bigg|_t \right)^2} \quad (25)$$

After the array of error-applied values has been calculated, the following equations are used to calculate an array of parameter adjustment values.

$$\Delta a_j = \sum_{n=1}^{N} \left( \left[ \frac{d\Delta out}{da_j} \bigg|_n \right] \left[ \frac{\Delta ERR_n}{K_n} \right] \right), \quad (26)$$

where $K_n = \sum_{j=0}^{J} \left( \frac{d\Delta out}{da_j} \bigg|_n \right)^2$ \quad (27)

B. Set up and Use of the Second Matrix Technique

The second matrix technique attempts to minimize the sum of the square of the real error. If this value is the true minimum then the derivative of this sum with respect to each of the parameters will be zero.

$$sum = \sum_{n=1}^{N} (error|_n)^2 \quad (28)$$

In the above equation the subscript to error refers to the different error signals and will be a function of the sample number n.

By taking the derivative of the above sum with respect to a representative parameter $a_j$, the result is:

$$\frac{d(sum)}{da_j} = 2 \sum_{n=1}^{N} (error|_n) \left( \frac{d(error)}{da_j} \bigg|_n \right) \quad (29)$$

The above equation is representative of a list of J equations, J being the number of parameters in the power series. The term involving the derivative of the error with respect to $a_j$ can be evaluated by the following equation:

$$\left( \left( \frac{d(error)}{da_j} \right) \bigg|_n = -\frac{dout}{da_j} \bigg|_n \right) \quad (30)$$

The term $error|_n$ in the above equation is not the actual sampled value of the error. Rather, it is the error that exists after all the corrections in the parameter values have changed the value of the error. Hence, the term $error|_n$ in Equation (29) is replaced with:

$error|_n + \Delta error|_n$

By making this substitution in Equation (29), and using the results of Equation (30) and dividing the results by −2, the result is:

$$\sum_{n=1}^{N} \left( error|_n + \Delta error \bigg|_n \right) \left( \frac{dout}{da_j} \bigg|_n \right) = 0. \quad (31)$$

The change in $error|_n$ that results from a change in the parameters can be calculated from:

$$\Delta error|_n = -\sum_{k=0}^{J} \left( \frac{dout}{da_j} \bigg|_n \Delta a_k \right) \quad (32)$$

where the numbering of the parameters is from zero to J.

By substituting the results of Equation (32) into Equation (31), the result is:

$$\sum_{n=1}^{N} [error|_n - \sum_{k=0}^{J} (\frac{dout}{da_j} \bigg|_n) \Delta a_k] \left[ \frac{dout}{da_j} \bigg|_n \right] = 0.$$

The above equation can be rearranged to be:

$$\sum_{n=1}^{N} \left( \frac{dout}{da_j} \bigg|_n \sum_{k=0}^{J} \left( \frac{dout}{da_k} \bigg|_n \Delta a_k \right) \right) = \sum_{n=1}^{N} (error|_n \frac{dout}{da_j} \bigg|_n). \quad (33)$$

Equation (33) can be further rearrange to be:

$$\sum_{k=0}^{J}\left(\Delta a_{k}\sum_{n=1}^{N}\left(\frac{dout}{da_{k}}\bigg|_{n}\frac{dout}{da_{j}}\bigg|_{n}\right)\right)=\sum_{n=1}^{N}\left(error\big|_{n}\frac{dout}{da_{j}}\bigg|_{n}\right). \quad (34)$$

Equation (34) is in the proper form to define a matrix that will permit the direct calculation of an array of parameter adjustment values:

$$\begin{bmatrix} V_{00} & V_{01} & \ldots & V_{0J} \\ V_{10} & V_{11} & \ldots & V_{1J} \\ \vdots & \vdots & \ddots & \vdots \\ V_{J0} & V_{J1} & \ldots & V_{JJ} \end{bmatrix} \begin{bmatrix} \Delta a_0 \\ \Delta a_1 \\ \vdots \\ \Delta a_J \end{bmatrix} = \begin{bmatrix} C_0 \\ C_1 \\ \vdots \\ C_J \end{bmatrix}. \quad (35)$$

The matrix shown in Equation (35) can be used to calculate an array of parameter adjustment values with the following substitutions:

$$V_{jk}=\sum_{n=1}^{N}\left(\frac{dout}{da_{k}}\bigg|_{n}\frac{dout}{da_{j}}\bigg|_{n}\right), \text{ and} \quad (36)$$

$$C_{j}=\sum_{n=1}^{N}\left(error\big|_{n}\frac{dout}{da_{j}}\bigg|_{n}\right). \quad (37)$$

An obvious point that should be mentioned is that when setting up the matrix shown as Equation (35), not necessarily all parameters should be used. The matrix should include only those parameters whose values can and will be adjusted. If some parameters will be excluded from the adjustment process, they should be excluded from the matrix. This means that the derivative variables for these parameters will not be used in the calculation of values of $V_{jk}$ or $C_j$.

Note that throughout this discussion of the second matrix technique, the range of the index of parameters has been from zero to J. This means that there will be J+1 parameters and the size of matrix used by the second matrix technique will be (J+1)×(J+1).

Please observe that $V_{jk}$ is equal to $V_{kj}$. This information can be used to reduce the amount of work required to setup the matrix shown in Equation (35).

To use the second matrix technique to train a power series using change in level signal, the following modifications are necessary:

$$\left(V_{jk}=\sum_{n=1}^{N}\left(\frac{d\Delta out}{da_{k}}\bigg|_{n}\frac{d\Delta out}{da_{j}}\bigg|_{n}\right)\right), \text{ and} \quad (38)$$

$$\left(C_{j}=\sum_{n=1}^{N}\left(\Delta error\big|_{n}\frac{d\Delta out}{da_{j}}\bigg|_{n}\right)\right). \quad (39)$$

The above modified equations will be used to define the terms used in Equation (35).

C. Evaluating the Determinant of Matrix Coefficients

If a determinant is defined by:

$$D = \begin{matrix} a_{00} & a_{01} & \ldots & a_{0n} \\ a_{10} & a_{11} & \ldots & a_{1n} \\ \vdots & \vdots & \ddots & \vdots \\ a_{n0} & a_{n1} & \ldots & a_{nn} \end{matrix} \quad (40)$$

The value of the determinant can be determined from:

$$value = \sum_{j=0}^{n}(-1)^{j}a_{0j}C_{0j} \quad (41)$$

where $C_{0j}$ is the cofactor of term $a_{0j}$. In the above equation, the value of the determinant is determined by expanding the determinant by the first row. The index of the coordinates of the terms in the determinant have been changed to correspond to the index used in a computer program.

In this equation the cofactor of a term is defined as the determinant that remains after the row and column of the term have been removed. Each one of these cofactors can in turn be evaluated used the same procedure used in Equation (41). Each time this reiterative procedure is used, the size of the determinant that must be dealt with is reduced by one. This technique can continue until the size of the determinant is only a single term. When this occurs the value of the cofactor is simply the value of the remaining term.

A float pointer is used for passing the determinant of coefficients to the procedure. The size of this array of floats will be the product of the number of rows by the number of columns. For the matrix shown in Equation (40) this number is $(n+1)^2$. The order in which these terms appear in the array is arbitrary, but the order that was chosen was to list all items in the first row, then all the items in the second row, etc. Then within each row the terms are listed in increasing column order. The code which can be used to evaluate a square determinant follows:

```
1   float TrainClass::EvaluateDeterminant(float* pLeft,int Size)
2   {
3       float* pLeft1;
4       float Answer,Term;
5       int iCol1,iRow,iCol;
6       if(Size<=1)
7           return (*pLeft);
8       answer=0.0;
9       pLeft1=(float*)malloc((Size-1 )*(Size-1)*sizeof(float));
10      for (iCol1=0;iCol1< Size;iCol1++)
11      {
12          for (iRow=1;iRow< Size; iRow++)
13          {
14              for (iCol=0;iCol< (Size-1);iCol++)
15              {
16                  if(iCol< iCol1)
17                      *(pLeft1+(iRow-1)*(Size-1)+iCol)=
18                          *(pLeft+iRow*Size+iCol);
19                  else
20                      *(pLeft1+(iRow-1)*(Size -1)+iCol)=
21                          *(pLeft+iRow*Size+iCol+1);
22              }
23          }
24          Term= *(pLeft+iCol1);
25          if (Odd(iCol1))
26              Answer +=- Term*EvaluateDeterminant(pLeft1,Size-1);
27          else
28              Answer +=+ Term*EvaluateDeterminant(pLeft1,Size-1);
29      }
```

-continued

```
30     free(pLeft1);
31     return (Answer);
32   }
33   int TrainClass::Odd(int input)
34   {
35     if ((input%2)==1)
36       return (TRUE);
37     else
38       return (FALSE);
39   }
```

A major part of this procedure is the construction of the determinant of the cofactor. This is done in the nested for loops between lines 12 and 23. The first for loop on line 12 steps through the rows of the determinant being constructed, while the second for loop on line 14 steps through the columns of the determinant being constructed. The location of the term of the cofactor determinant being constructed is in row zero and at the column position determined by integer variable iCol1. This variable is used on line 16 and 24, and has its value determined by the for loop on line 10. Note the similarity of the code on lines 26 and 28 to Equation (41). The choice of which of the two equations are used is determined by the odd properties of the column of the term. This decision is made by the code on line 25. The value of the term is determined by line 24. The value of the float answer is changed by lines 26 or 28 on each pass through the for loop controlled by line 10. This recursive process will continue reducing the size of the determinant by one on each recursion. However when the size of the determinant is one the value of the variable Size will be one and the code on lines 6 and 7 will return the value of the remaining variable in the determinant.

D. Recursive Procedure for Determining a Solution from the Equations of the Second Matrix Technique.

When a matrix of equations has more than one solution, the normal matrix technique will not work. Under these circumstances an alternate technique must be found for finding a solution. This technique is to assume a solution of an array of $\Delta a$ values and substitute this solution in one of the equations in the matrix of equations used in the second matrix technique. This solution will not be accurate and will result in an error in the equation's output. This error is then allocated to the various $\Delta a$ values of the assumed solution based on their derivative with the output. This procedure is repeated on all equations of the second matrix technique until the absolute value of the error on all equations is less than a very small value.

This procedure can be described more formally as:

Assume a solution of an array of $\Delta a$ values.

Substitute this solution into one of the equations of matrix of equations used in the second matrix technique.

Calculate an error in the value of the equation using:

$$ERR_n = C_n - \sum_{k=0}^{J} V_{nk} \Delta a_k.$$

If absolute value of $ERR_n$ is less than a small positive limit tag a bit than equation is in range, otherwise tag equation as out of range.

If equation is out of range, change the value of all $\Delta a$ values of the assumed solution using:

$$\Delta a_j = \Delta a_j + \frac{V_{nj} ERR_n}{K_n}, \text{ where } K_n = \sum_{k=0}^{J} V_{nk}^2$$

Repeat the above procedure on all equations in the matrix of the second matrix technique. Terminate this procedure when all equations have been tagged as in range.

Incorporate calculated parameter changes by using the following equation on all parameters:

$$a_j = a_j + \Delta a_j$$

The code that can be used to implement this procedure follows:

```
1   float* TrainClass::ReiterativeAdjust(float* pLeft,float*
      pRight,int Size)
2   /* pLeft=pointer to matrix; size of matrix is size*size
3      pRight=pointer to array of equations values.
4      Size=number of variables in each of the equations or number of
5      equations. */
6   {
7     float Answer[20], Temp;
8     float Error,Output,K[20];
9     int in_range[20],iRow,iCol,iStop;
10    for (iRow=0;iRow< Size;iRow++)
11    {
12      Answer[iRow]=0.0;
13      in_range[iRow]=FALSE;
14      K[iRow]=0.0;
15      for (iCol=0;iCol< Size;iCol++)
16      {
17        Temp= *(pLeft+iRow*Size+iCol);
18        K[iRow] += Temp*Temp;
19      }
20    }
21    iStop=FALSE;
22    do
23    {
24      for (iRow=0;iRow< Size;iRow++)
25      {
26        Output=0.0;
27        for (iCol=0;iCol< Size;iCol++)
28          Output += (*(pLeft+iRow*Size+iCol))*
29            answer[col];
30        Error= *(pRight+iCol) - Output;
31    if (AbsoluteValue(Error)< 0.01)
32          in_range[iRow]=TRUE;
33        else
34        {
35          in_range[iRow]=FALSE;
36          for (iCol=0;iCol< Size;iCol++)
37          {
38            Temp= *(pLeft+iRow*Size+iCol);
39            Answer[iCol] += Temp*Error/K[iRow];
40          }
41        }
42      }
43      iStop=TRUE;
44      for (iRow=0;iRow< Size;iRow++)
45      {
46        if (in_range[iRow]==FALSE)
47          iStop=FALSE;
48      }
49    } while (? iStop);
50    for (iRow=0;iRow< Size;iRow++)
51      *(pRight+iRow)=answer[iRow];
52    return (Answer);
53  }
```

In this code the procedure ReiterativeAdjust( ) is passed the matrix of $V_{ij}$ value as an array of floats pointed to be pointer pLeft. The size of this matrix is passed to the procedure in the integer Size. The actual length of the array of floats pointed to by pLeft will be Size$^2$. The order of the $V_{ij}$ terms in the array pointed to by pLeft will be all terms in row zero will be listed first, etc. All term within each row will be listed in column order. The array of value of $C_j$ that constitute the terms on the right side of Equation (31) are passed to the procedure ReiterativeAdjust( ) in an array pointed to by pRight. One of the first things this procedure does is to initialize a number of variables in lines 10 through 20. Included in this initialization is the calculation of the constant used to allocate the error to the assumed solution. When the error is allocated to the assumed solution as shown in the code on line 39 the error will be completely eliminated. This is because the technique used to calculate K[iRow] is the same technique used to calculate K shown in Equation (21). The value of K[iRow] is calculated in the code between lines 15 and 19. The test to determine if the assumed or calculated solution is accurate enough is done on line 31. If it is not, the assumed solution is corrected on line 39. The test to set the stop flag that determines if the procedure should stop is done between lines 43 and 48. On line 49 the iStop flag is tested to determine if the procedure should stop. In lines 50 and 51 the calculated solution is put in the array of variables used to define the values of the equations.

The above procedure can be modified by grouping the equations and using the technique of the first matrix technique to calculate a change in the parameters that satisfies the group of equations, and then repeat the procedure on the next group etc.

Mixed Training

The technique built into the equations used to set up both the first matrix technique and second matrix technique, suggest that only level or change of level training can be used within one matrix. This is not true. A level data point can be used to define one of the equations used in the first matrix technique. It is only necessary to make sure that the correct derivatives are used in calculating the coupling between equations, etc. When calculating the value of the $V_{rc}$ and $C_r$ terms used in the second matrix technique, one of the data points used can be a level data point instead of the data from a change-data-point normally used. By combining different type of data points in this way both the level and change of level can be adjusted.

Practical Application

The use of change level training of a power series increases the usefulness a power series by increasing the rate of training without the use of a matrix, etc. By using change level training you are in effect using level training and a matrix to train the two data points used to generate the change signal data.

While the above is a complete description of specific embodiments of the invention, various modifications, alternative constructions, and equivalents may be used. Therefore, the above description should not be taken as limiting the scope of the invention as defined by the claims.

What is claimed is:

1. In a control system requiring training of a multivariable power series to learn a desired function, said control system having signal inputs and generating control signal outputs for controlling an apparatus, said power series being fully defined by parameters used in said power series, order of polynomial with each input variable, and number of input variables, said power series yielding an output of a change variable in response to an array of change variables inputted to said power series, said change variable consisting of a level variable and a change of level variable, where a change output is the change of level variable component of said change variable outputted by said power series, a method for obtaining said change output for use in modifying power series parameters to learn said desired function, said method comprising:

establishing such a change variable for each input to said power series, each said change variable inputted to said power series related to two data points, wherein each said data point is characterized by an array of input values and a desired output value; and calculating said change output directly from said change variables inputted to said power series; and using said change output for adjustment of parameters of said power series for use in generating said control signal outputs.

2. In the method according to claim 1, further comprising:

thereafter calculating derivatives of said parameters used in said power series with said change output.

3. In the method according to claim 2, further comprising:

calculating a desired change output directly from said two data points;

processing said power series to calculate said change output; said change output being referred to as actual change output;

thereafter comparing said desired change output with said actual change output to obtain an error value; and adjusting said parameters of said power series by an array of adjustment values, where each adjustment value is proportion to said error value and the corresponding value of one of said derivatives of said parameters with said change output.

4. The method of claim 1 wherein said step of calculating the change output from the multivariable power series comprises:

defining a structure for a change variable for variable $x_1$ containing two floats as level and $\Delta$level, where level is the value of level of $x_1$ for data point #1, and $\Delta$level is the value of level of $x_1$ for data point #2 minus the value of level of $x_1$ for data point #1;

defining a first modified arithmetic operator for addition of two change variables or the multiplication of a change variable by a parameter as linear operations;

defining a second modified arithmetic operator for addition of a parameter and a change variable as resulting in a change variable wherein the value of level is the only component changed, as shown by the following equation:

$$(x+a,\ \Delta x)=(x,\ \Delta x)+a;$$

defining a third modified arithmetic operator for multiplication of two change variables as governed by the following equation:

$$(\text{out},\ \Delta\text{out})=(x,\ \Delta x)*(y,\ \Delta y)$$

where out=xy and $\Delta\text{out}=x\Delta y+y\Delta x+\Delta x\Delta y$; and given that out of a multivariable power series is determined by an equation of the form:

$$out = \sum_{i,j,k=0}^{I,J,K} a_{ijk} x_1^i x_2^j x_3^k,$$

calculating the change output by 1) calculating change variables for each of the inputs to said power series and then 2) using the first, second and third modified arithmetic operators on said power series to obtain a resulting change variable and then 3) using Δlevel of the resulting change variable from said power series to obtain the change output, said change output being the difference in value of said power series when processed with data from data point #2 and when processed with data from data point #1.

5. A method for calculating the derivative of all the parameters used in the construction of the multivariable power series with respect to the change output based on the method of claim 4, the method comprising:

using the equation used for calculating out of the multivariable power series of the form $$out = \sum_{i,j,k=0}^{I,J,K} a_{ijk} x_1^i x_2^j x_3^k$$

of claim 4 to generate an equation of the form $$\Delta out = \sum_{i,j,k=0}^{I,J,K} a_{ijk} \Delta level_{ijk};$$

where the derivative of parameter $a_{ijk}$ with respect to Δout is $\Delta level_{ijk}$, and repeating this procedure for all parameters used in construction of said multivariable power series.

6. In an information processing system, a method for training a power series, said information processing system having signal inputs and generating data signal outputs, said power series comprising a weighted sum of product terms, said product terms including combinations of products and powers of the input values, the method comprising the steps of:

(a) accepting training data composed of data points in which each said data point is defined as an array of input values and a desired output value;

(b) forming a data-point-pair from two data points picked from said training data, where said data-point-pair contains an array of change variable input values and a desired-change-output value;

(c) processing said array of change variable input values in said power series to calculate an actual-change-output value;

(d) computing an error-actual-value by subtracting said actual-change-output value from said desired-change-output value;

(e) computing an array of parameter-derivatives, each of said parameter-derivatives being the derivative of a parameter used to construct said power series with respect to said actual-change-output value;

(f) computing an adjustment value for one of said parameters, said adjustment value including an error-applied value and said parameter-derivative, said error-applied value being derived at least in part from said error-actual value; and (g) adjusting said one of said parameter by an amount derived at least in part from said adjustment value.

7. The method of claim 6 wherein, in said step of computing an adjustment value, said adjustment value is proportional to said error-applied values and proportional to said parameter-derivative.

8. The method of claim 7 further including computing a constant of proportionality (K) represented by:

$$K_\Delta = \sum_{k=0}^{J} \left(\frac{d\Delta out}{d a_k}\right)^2, \text{ where } \frac{d\Delta out}{d a_k}$$

is the value of said parameter-derivative for parameter $a_k$ and the summation is over all parameters to be adjusted.

9. The method of claim 7 wherein said adjustment value computing step (f) further includes computing an array of error-applied values based on an array of error-actual values according to a solution to a set of linear equations to compensate for coupling between said data-point-pairs, each said linear equation representing said error-actual value as a sum of products of coupling coefficients and said error-applied values.

10. The method of claim 9 wherein the determinant of the coefficients of said set of linear equations is first evaluated to determine if its value approaches zero;

if value of said determinant does approach zero, used second matrix technique of:

(h) computing a (J+1)×(J+1) matrix comprising coefficients of $V_{jk}$ for row$_j$ and column k, each $V_{jk}$ defined by $$\left(\sum_{n=1}^{N} \left(\frac{d\Delta out}{d a_k}\bigg|_n \frac{d\Delta out}{d a_j}\bigg|\right)\bigg|_n\right),$$

where
$a_j$ is the $J^{th}$ parameter, ranging from 0 to J, so there are J+1 parameters, $$\left(\frac{d\Delta out}{d a_j}\bigg|\right)_n$$

is the $n^{th}$ data-point-pair value of the parameter-derivative for parameter $a_j$;

(i) computing a 1×(J+1) array comprising coefficients $C_j$, wherein each $C_j$ equals $$\sum_{n=1}^{N} \left(error|_n \frac{d\Delta out}{d a_j}\bigg|_n\right),$$

where $error|_n$ is the $n^{th}$ data-point-pair of said error-actual value;

(j) computing a set of adjustment values $\Delta a_j$ by solving $$\begin{bmatrix} V_{00} & V_{01} & \ldots & V_{0J} \\ V_{10} & V_{11} & \ldots & V_{1J} \\ \vdots & \vdots & \ddots & \vdots \\ V_{J0} & V_{J1} & \ldots & V_{JJ} \end{bmatrix} \begin{bmatrix} \Delta a_0 \\ \Delta a_1 \\ \vdots \\ \Delta a_J \end{bmatrix} = \begin{bmatrix} C_0 \\ C_1 \\ \vdots \\ C_J \end{bmatrix}; \text{ and}$$

(k) adding said set of adjustment values to said parameters, thereby adjusting said parameters.

11. The method of claim 10 further including the steps of:

evaluating the determinant of the coefficients of said second matrix technique to determine if the value of said determinant approaches zero, and if so:

(l) applying an iterative technique to each equation of said second matrix technique by using an assumed solution, said assumed solution including an array of assumed values of $\Delta a_j$, inserting said assumed solu tion in one of the equations of said second matrix technique to obtain an error, said error defined by $$ERR_n = C_n - \sum_{k=0}^{J} V_{nk} \Delta a_k;$$

then (m) calculating an adjustment value to each $\Delta a_j$ value in said assumed solution according to the following equation:

$$\Delta^2 a_j = \frac{V_{nj} ERR_n}{K_n},$$

where $ERR_n$ is an error for the $n^{th}$ equation, and $K_n$ is defined by $$K_n = \sum_{k=0}^{J} V_{nk}^2;$$

(n) applying said adjustment value to each $\Delta a_j$ value in said assumed solution by:

$\Delta a_j = \Delta a_j + \Delta^2 a_j$, (o) repeating the above sequence (l) through (n) on another equation in said second matrix technique until the absolute value of the said error is less than a small positive limit for all equations of said second matrix technique, then (p) equating said set of adjustment values to said assumed solution; and (q) applying said set of adjustment values to said parameters, thereby adjusting said parameters.

* * * * *